US008335585B2

(12) United States Patent
Hansl et al.

(10) Patent No.: US 8,335,585 B2
(45) Date of Patent: Dec. 18, 2012

(54) WAREHOUSE FOR TRANSFERRING GOODS AND METHOD FOR OPERATING SAID WAREHOUSE

(75) Inventors: Rudolf Hansl, Linz (AT); Dieter Klug, Treffelstein (DE)

(73) Assignees: TGW Logistics Group GmbH, Wels (AT); Klug GmbH Integrierte Systeme, Teunz (DE)

( * ) Notice: Subject to any disclaimer, the term of this patent is extended or adjusted under 35 U.S.C. 154(b) by 859 days.

(21) Appl. No.: 11/665,905

(22) PCT Filed: Oct. 10, 2005

(86) PCT No.: PCT/AT2005/000401
§ 371 (c)(1),
(2), (4) Date: Jun. 3, 2009

(87) PCT Pub. No.: WO2006/042347
PCT Pub. Date: Apr. 27, 2006

(65) Prior Publication Data
US 2009/0299521 A1    Dec. 3, 2009

(30) Foreign Application Priority Data

Oct. 22, 2004    (AT) .................................. A 1783/2004

(51) Int. Cl.
*G06F 7/00*    (2006.01)
*B65G 65/00*    (2006.01)

(52) U.S. Cl. ........ 700/230; 700/217; 700/214; 414/274; 414/276; 414/267

(58) Field of Classification Search ........................ None
See application file for complete search history.

(56) References Cited

U.S. PATENT DOCUMENTS
3,379,321 A    4/1968    Weir
(Continued)

FOREIGN PATENT DOCUMENTS
DE    33 43 858    6/1985
(Continued)

OTHER PUBLICATIONS
International Search Report.
(Continued)

*Primary Examiner* — Gene Crawford
*Assistant Examiner* — Yolanda Jones
(74) *Attorney, Agent, or Firm* — Collard & Roe, P.C.

(57) ABSTRACT

The invention describes a goods distribution center (1) and a method for its operation for goods (9) to be handled preferably in partitioned storage and transport containers (8) with at least two storage areas (5, 7) for groups of goods with varying turnover frequencies. It comprises an incoming goods area (2), an outgoing goods area (6) and at least one order picking area (4). Conveying devices (10) form for example conveyor belts, roller conveyors, storage and retrieval means (12), e.g. shelf operating devices. Storage devices form e.g. high shelf, flow shelf storage etc. Furthermore, data input and output devices (26) are provided at workstations (18) and connected communicatively with a storage, control and monitoring device (25). The conveying devices (10) of the incoming goods area (2) and the order picking area (4) are in the form of continuous conveying devices (14, 16), which are connected via transfer conveying means (15) to one another and to storage and retrieval means (12). At the conveying devices (10) with the storage, control and monitoring device (25) communicatively connected detecting means (23) are arranged e.g. data scanners (24) for the detection of container data of the storage and transport containers (8).

30 Claims, 4 Drawing Sheets

U.S. PATENT DOCUMENTS

| | | | |
|---|---|---|---|
| 5,246,332 A | | 9/1993 | Bernard, II et al. |
| 5,472,309 A | * | 12/1995 | Bernard et al. ............... 414/807 |
| 5,934,413 A | | 8/1999 | Koenig et al. |
| 7,261,509 B2 | | 8/2007 | Freudelsperger |
| 2005/0043850 A1 | * | 2/2005 | Stevens et al. ............... 700/213 |

FOREIGN PATENT DOCUMENTS

| | | |
|---|---|---|
| DE | 195 26 131 | 1/1997 |
| DE | 101 36 354 | 2/2003 |
| EP | 0 943 561 | 9/1999 |
| EP | 1 452 462 | 9/2004 |

OTHER PUBLICATIONS

English Translation of International Preliminary Report on Patentability.

Thomas Preuβ: "Kommissioniersystem macht Denken überflüssig", Industrieanzeiger 45/2003, Leinfelden-Echterdingen, Germany, Nov. 2003, p. 32, middle column.

"Schneller kommissionieren mit dem Schäfer Carousel System (SCS)", SSI Schäfer update, Neunkirchen, Germany, Jan. 2003, p. 7.

Video: "Wolf-Kommissionier-System", Wolf Handling-System-Technik, Helmstadt, Germany, date unknown. (on CD submitted herewith).

Kapferer system design drawings S 9650, Graz, Austria, date unknown.

Kapferer system design drawings A-000316, Graz, Austria, date unknown.

Richtangebot "Wolf-Kommissionier-System" Nr. 20 243, Offer of WOLF Montage Automationsanlagen und Sondermaschninen GmbH to Holdermann GmbH, Baden Baden, Germany, Jul. 2000.

Armin Grüb, Requirement Specification—"Pflichtenheft LVS für das Projekt 'Langsamdreher' der Wolf Montage-Automationsanlagen-Sondermaschinen GmbH Helmstadt", Veitshöchheim, Germany, Jan. 1997.

Holdermann GmbH drawings 20243 V5, Helmstadt, Germany, Jul. 2000.

* cited by examiner

WAREHOUSE FOR TRANSFERRING GOODS AND METHOD FOR OPERATING SAID WAREHOUSE

CROSS REFERENCE TO RELATED APPLICATIONS

This application is the National Stage of PCT/AT2005/000401 filed on Oct. 10, 2005 which claims priority under 35 U.S.C. §119 of Austrian Application No. A 1783/2004 filed on Oct. 22, 2004. The international application under PCT article 21(2) was not published in English.

The invention relates to a goods distribution centre as described in the preamble of claim 1 and a method for the operation thereof as described in the preamble of claim 17.

From DE 101 36 354 A1 a method and installation are known for picking orders of goods from containers with a shelf storage arrangement and allocated shelf operating devices and with conveying devices for servicing order picking workstations with containers for the removal of the ordered goods and for the return transport of the containers to the storage area and for the removal of order holding containers from the order picking area to the outgoing goods area. In this case the container storage area is restocked with incoming goods during breaks in order picking or at times when the order picking area is not busy.

From document DE 33 43 858 A1 an order picking depot is known with a goods storage area divided into two sections, one for goods with high and average turnover frequency and one for goods with low turnover frequency. The storage area for goods with high and average turnover frequency are provided with the necessary transport devices for simple manual order picking, whereas the storage area with goods of low turnover frequency is equipped with necessary conveying means for multiple manual order picking, whereby for filling with goods in large quantities the transport device is used for the multiple order picking area, and for filling with goods in large quantities a conveying device of the same design is provided for the other storage area. The order picking takes place both in parallel and in serial sequence, whereby the parallel order picking sequence is preferably used in less busy order picking periods and requires the additional task of bringing together the parts of the orders at the goods exit. The conveying devices provided for supplying goods from the incoming goods area to the storage areas are preferably in the form of gondola-suspension conveyors and have gondola storages units for adjusting the circulating gondolas to the required storage capacity.

From a further document EP 1 452 462 A2 a device and a method are known for picking orders of goods. The device comprises an automated shelf storage unit for goods stored in containers and order picking work areas that can be supplied via conveying devices for moving the selected item from storage containers to the container provided for holding the order. The order picking stations are arranged behind automated buffer areas for storage containers provided or called up for order picking. This enables the order picking of so-called low turnover items according to the goods-to-man principle and by reducing the distances to be covered by the picker increases the performance of the picker and provides an ergonomic design of workstation in the order picking area.

The objective of the invention is to provide a goods distribution centre, in which for goods stored in containers, particularly partitioned containers, the incoming and outgoing goods are processed with a high turnaround.

This objective of the invention is achieved in that the conveying devices in the incoming goods area and the order picking area are in the form of continuous conveying devices, which are connected to one another and to the storage and retrieval means via transfer conveying means, and detection means, e.g. data scanners, are arranged on the conveying devices in communication with the control and monitoring device for the detection of container data from the storage and transport containers. The surprising advantage here is that by means of the conveying devices connected to one another and designed in the form of continuous conveyors, in the incoming goods area and order picking area, and the permanent current status of the container situation on the goods or articles available in the container and their stock level and the storage or conveying position of the container there is flexible allocation between the various areas of the distribution centre, in particular between the incoming goods area and the order picking area, whereby fast reaction times can be achieved for the provision of containers in response to a request by the order picking area for the completion of an order. This makes it possible without interruption or reduction in output of the order picking process to undertake the continuous processing of incoming goods parallel to the processing of outgoing goods.

An embodiment according to claim 2 is advantageous as thereby a flexible adjustment is possible of the holding capacity of the storage and transport containers to the varying volume of incoming goods, which changes considerably during the course of a day.

An embodiment according to claim 3 is also advantageous, in which in the allocation of the storage and transport containers shorter reaction times are achieved, so that after a request, e.g. from the order picking area, the containers can be made available in rapid sequence, thereby achieving a high order picking output.

By means of the embodiment characterised in claim 4 a greater utilisation of the storage and transport containers is achieved, i.e. a higher filling level, by means of which there is greater utilisation in the storage areas thus saving storage capacity. Furthermore, identical types of articles are distributed into several storage and transport containers and the latter are stored in different shelf spaces to obtain an even utilisation of the storage and retrieval means and the conveying device.

An embodiment according to claim 5 is also possible however, and thereby account can be taken of the different quantities of the types of articles to be distributed.

By means of the solution characterised in claim 6 an exact allocation of articles to storage and transport containers or holding compartments is achieved and also the alignment of the storage and transport container on the conveying device can be established at the workstations of the incoming goods area and in the order picking area, and in this way an automated identification of the holding compartments provided for filling or removal can be used, e.g. by light pointer devices. In this way incorrect manipulations in the incoming goods area as well as in the order picking area are avoided as far as possible.

According to the advantageous embodiment described in claim 7 a direct transportation of the picked order to the outgoing goods area is achieved.

An embodiment according to claim 8 is also advantageous as thereby a checking and monitoring function is performed directly at the workstations.

By means of the advantageous embodiment described in claim 9 a spatial and temporal uncoupling of the continuous conveying devices of the incoming goods area and the order picking area is achieved.

The embodiments according to claims 10 to 13 are also advantageous, in that the transport system is split into subdivided transport sections for the continuous monitoring of the containers for example, and in this way a high degree of flexibility is achieved with regard to container allocation.

The embodiment characterised in claim 14 makes it possible to carry out a continuous plausibility check of the quantities of items reported by the operators on adding or removing articles by means of a weighing check with the individual weights known from the detection of articles and from said article data, whereby a manipulation error is displayed directly and prior to the transfer of the transport and storage container or the container holding the order and errors can be corrected straight away without causing any further disruptions to the process.

An embodiment according to claim 15 is also advantageous in that the manipulation to be performed by the operator is displayed clearly and a manipulation error is prevented as far as possible.

Lastly, an embodiment according to claim 16 is also advantageous in that if necessary short-term additional storage and transport containers are made available to the incoming goods area.

The objective of the invention is also to provide means for operating a goods distribution centre, by means of which the incoming goods can be processed without interruption and/or reduction in output of the order picking of the outgoing goods according to the amount of incoming goods.

This objective of the invention is achieved by the measures described in the characterising part of claim 17. According to the latter an outgoing goods order for types of articles is identified in the computer and data memory unit, and the storage and transport container containing the order-related item is supplied by the storage, control and monitoring device to the order picking area or a workstation of the order picking area to meet demand, preferably from the storage area, or in the case of additional demand is supplied via the conveying device from the incoming goods area at the same time as at least one order holding container indexed for the outgoing goods order. The surprising advance here is that in addition to the high availability of the article required by the order picking area from the storage area additional demand, for example in case of low stock levels, can be covered by stock in the incoming goods area by the direct allocation of the corresponding storage and transport containers. Furthermore, a continuous processing of the incoming goods parallel to the processing of outgoing goods, in particular to the order picking operation can be carried out, and in this way the incoming articles supplied to the goods distribution centre can be made ready without delay and without impairment of the order processing according to the incoming stock, which is subject to fluctuations over the course of a day. In this way the flexibility of working time and staff planning is increased by improved adaptability of the use of staff and also the availability of the stock is increased.

The measures described in claims 18 and 19 are advantageous in which a clear allocation of goods to order is achieved and the order picking process is accelerated considerably.

By means of the advantageous measures according to claims 20 to 22 an operator guide for preventing as far as possible errors in the allocation of goods is provided, by means of which also a change of staff to cover peak times in the various areas is simplified.

The advantageous measures described in claims 23 and 24 enable the immediate interruption of the processing of incoming goods if there is a priority request from the order picking area for a specific product, whereby by means of intermediate detection the processing of incoming goods can be resumed after the completion of the order picking process and the corresponding storage and transport container can return to the incoming goods area or the workstation. This rapid reaction to a request from the order picking area makes it possible to process the incoming goods continuously and parallel to the processing of outgoing goods without reducing the distribution of order-related goods.

The measures according to claims 25 and 26 are also advantageous in which a high degree of utilisation of containers and thereby storage is achieved, by means of which an extremely economical relationship is achieved between the storage capacity provided and volume of goods to be distributed and thereby overall the goods distribution centre can be highly profitable.

The measures according to claim 27 ensure continuous monitoring of the distribution of goods and thus provide ongoing quality control of the processes and the continuous documentation required.

According to the measures described in claim 28 the availability of the storage and transport containers for processing incoming goods is ensured, in particular with respect to their rapid availability for the processing of outgoing goods and peak times for storage and retrieval in the storage areas and the storage and retrieval means.

Measures according to claims 29 and 30 are also advantageous in which the brief availability of storage and transport containers requested by the workstations is achieved for the storage or retrieval of goods.

According to the measures described in claim 31 peak utilisation times are effectively avoided on storing and retrieving the storage and transport containers in the storage areas, in particular also for the storage and retrieval means.

By means of the measures described in claims 32 and 33 a high average utilisation of the containers is achieved.

The measure described in claim 34 ensures, even with a conveyor-determined change in the alignment of the container, the exact allocation of the holding compartments, as required for correctly displaying the holding compartments to be operated for storage and removal by means of the light pointer devices at the workstations.

Finally, the measures described in claim 35 ensure the precise guiding of the operator, whereby incorrect manipulations when placing the item in the storage and transport containers or holding compartments is avoided as far as possible.

For a better understanding of the invention the latter is explained in more detail with reference to the examples described in the following figures. Shown are.

First of all, it should be noted that in the variously described embodiments the same parts are allocated the same reference numbers and the same component names, whereby the disclosures contained throughout the description can be applied accordingly to the same parts with the same reference numbers or same component names. The details used in the description on position such as top, bottom, side etc. refer to the figure being described at the time, and where there is a change of position should be adjusted to the new position accordingly. Furthermore, individual features or combinations of features of the shown and described embodiments can in themselves represent independent, inventive solutions.

Figure 1:
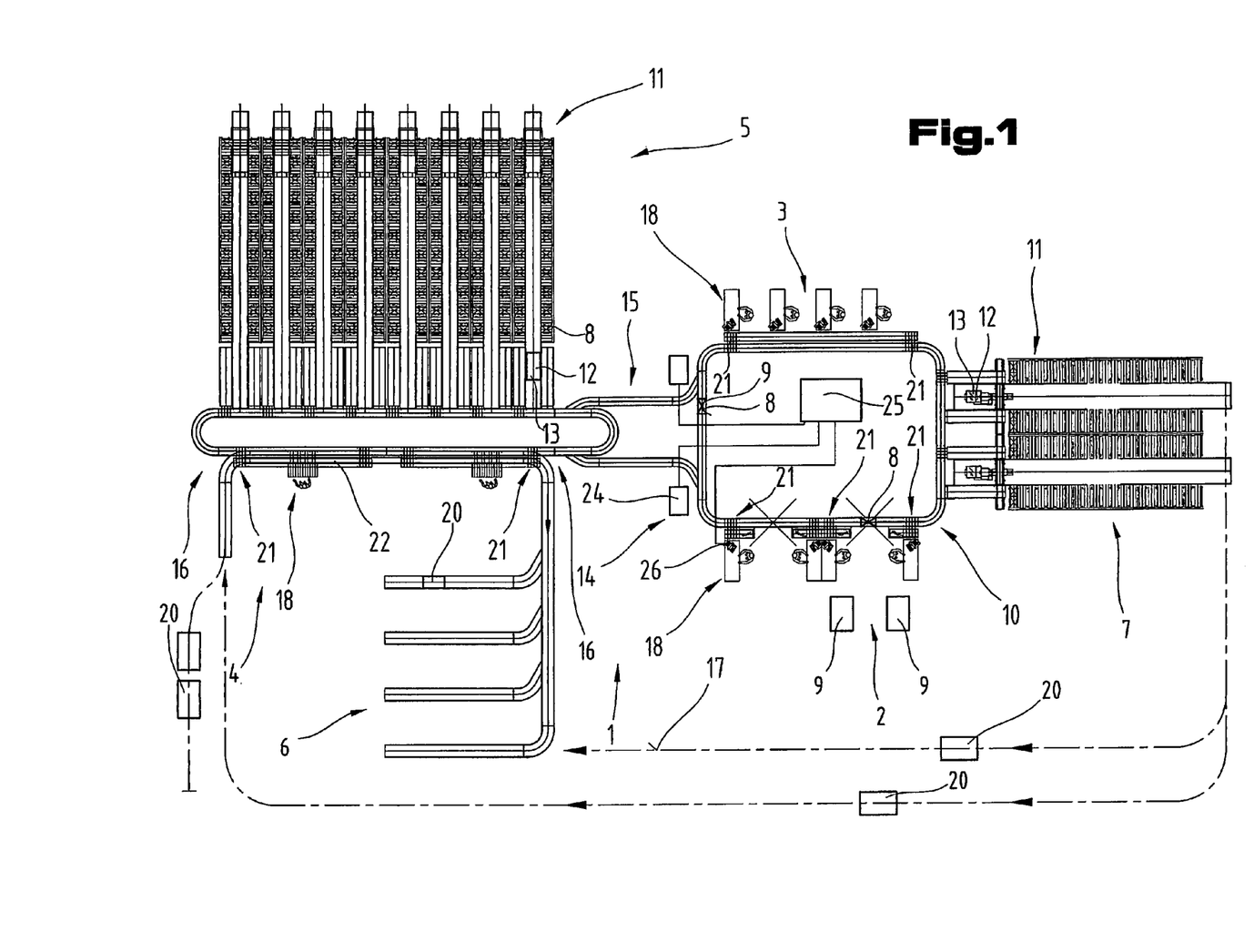
FIG. 1 a goods distribution centre represented in a simplified layout.

FIG. 1 shows a goods distribution centre 1 with the essential areas, namely the incoming goods area 2 with the returns entry 3 defined as a separate area due to the more extensive entry processing, and the order picking area 4 with allocated storage area 5, and the outgoing goods area 6 arranged after the order picking area 4. An additional storage area 7 is preferably connected directly to the incoming goods area 2.

From the storage area 7, preferably by means of order picking machines—not shown in detail—the processing of outgoing goods is performed and this storage area 7 is intended for "high-turnover" articles. Articles with a lower and more average turnover frequency are provided in the storage area 5 arranged immediately next to the order picking area 4.

The articles are designated as so-called "A", "B" and "C" articles for example by referring to continuously performed analyses of turnover, permanent stock control etc., whereby allocation into one of the categories and thereby the storage areas 5, 7 is variable.

The design of the goods distribution centre 1 with regard to the storage device and conveying device is set up for the distribution of goods using storage and transport containers 8. Incoming goods 9 are placed in the incoming goods area 2 into the storage and transport containers 8, conveyed by means of a conveying device 10 connecting the individual areas and supplied to the storage areas 5, 7 for storage on storage shelves 11 or conveyed directly to the order picking area 4 to make up the goods order.

The conveying device 10 can be in the form of a conveyor belt, roller conveyor, apron conveyor etc. The storage shelves 11 are preferably high shelves but for specific groups of goods can also be flow racks. The storage shelves are preferably accessed by using allocated storage and retrieval means 12, such as for example shelf operating devices 13.

The conveying device 10 of the incoming goods area 2 with the associated returns area 3 is designed as a continuous conveying device 14, which is transport-connected via transfer conveying means 15 to the conveying device of the order picking area 4, which is also designed as a continuous conveying device 16.

Independently of the distribution of "B" and "C" articles via the order picking area 4 the storage area 7 with high turnover "A" articles is directly connected to the continuous conveying device 14 of the incoming goods area 2 for distribution by the storage and transport containers 8.

From storage area 7 the goods are distributed, not shown in more detail, preferably by means of order picking machines into order holding containers, which in the case of "B" and "C" articles are sent to the order picking area 4 or, if this is not the case, are conveyed directly to the outgoing goods area 6—according to arrow 17. In the incoming goods area 2, returns area 3 and order picking area 4 there are workstations 18 on the continuous conveying devices 14, 16 for processing the incoming goods and for picking out goods in an corresponding amount for resetting the processing capacity provided for the goods distribution centre 1, which is specified by known capacity identification numbers, and from said identification numbers the size of the storage areas 5, 7 and the necessary conveying capacity of the conveying device 10 can be determined, forming the basis for the distribution of goods by means of the storage and transport containers 8.

As already indicated, the goods distribution centre 1 according to the invention is provided in particular for goods 9 with small to average package sizes, whereby there is one more or less large belt width for the number of individual packages according to the turnover frequency of different articles. To achieve the greatest possible turnover figures and high utilisation of the storage areas 5, 7, as already mentioned above, but preferably not only in storage area 7, for "A" articles undivided storage and transport containers 8 are used, in storage area 5 for the "B" and "C" articles preferably storage and transport containers 8 divided into holding compartments 19 are used. Preferably, the partitioned storage and transport containers 8 have two, three, four, six or eight such holding compartments 19 for the differentiated storage of various articles. Of course, non-partitioned storage and a transport containers 8 are used for goods 9 to be distributed in larger amounts or volumes. In addition, storage and transport containers 8 of varying heights can be used accordingly to achieve a high filling level even for large-volume goods 9.

Order holding containers 20, which hold the "A" articles picked out to order from the storage area 7 or by the picking machines and "B" and "C" articles picked out in the order picking area 4 are preferably unpartitioned.

The workstations 18 for processing incoming goods and picking orders are, as explained in more detail below, equipped in accordance with the specific requirements. Preferably, subsidiary conveyors 22 for storage and transport containers 8 and/or order holding containers 20 are provided at these workstations 18 that are transport-connected via feeder and ejector means 21 to the continuous conveying devices 14, 16.

A container guiding and detection device is provided by a number of detection means 23 (FIG. 2) arranged on the conveying device 10, in particular continuous conveying devices 14, 16, transfer conveying means 15, feeder and ejector means 21 and storage and retrieval means 12, in particular data scanners 24 for detecting container data, which enables the clear identification and tracking of the storage and transport containers 8 by means of data sets attached to the latter e.g. barcodes, electronic data carriers etc. The container data established in this way is managed in at least one central storage, control and monitoring device 25 which manages all the goods and container distribution, and is preferably connected to decentrally arranged data input and output devices 26 provided in particular at the workstations 18 or communicates via wireless data and/or signal transmission.

Figure 2:
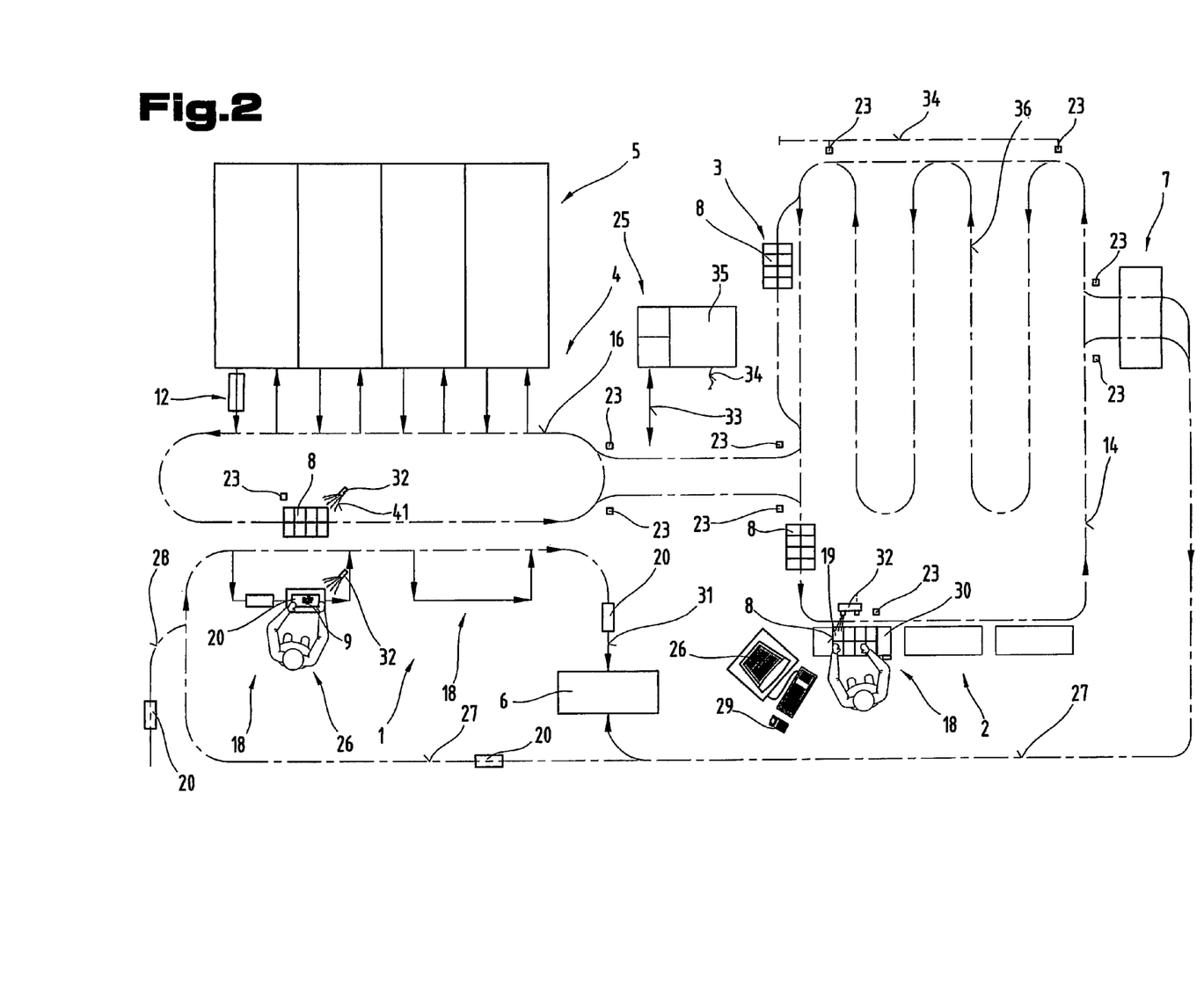
FIG. 2 a schematic view of the goods distribution centre to clarify the method according to the invention.

FIG. 2 shows a schematic representation of the incoming goods area 2 with the continuous conveying device 14 and the order picking area 4 with the additional continuous conveying device 16 and the storage areas 5, 7 connected to the latter via the conveying device 10 and the storage and retrieval means 12.

The continuous conveying devices 14, 16 are connected via the transfer conveying means 15 by means of which the storage and transport containers 8 can be conveyed optionally in two directions.

The storage area 5 consisting of storage shelves 11 is transport-connected via the storage and retrieval means 12 for container transfer with the continuous conveying device 16 of the order picking area 4. As already explained above, both storage and transport containers 8 that are partitioned into holding compartments 19 and those that are not are used depending on the turnover frequency of the types of articles and on the volume of the respective articles which is dependent thereon to a certain degree. In this case it is intended to distribute types of articles that are often picked out into several of the storage and transport containers 8, because in this way bottlenecks in the access area are avoided as far as possible, i.e. so that it is possible to access one type of article at several of the workstations 18 of the order picking area 4 simultaneously.

The completion of the order picking of goods 9 is performed at workstation 18 of the order picking area 4 into the order holding containers 20, which are conveyed by means of an order conveying device 27 independently of the continuous conveying device 14 to workstations 18 for filling, and when completed are conveyed to the outgoing goods area 6 for processing outgoing goods, e.g. preparation of delivery paperwork, packaging, address labelling.

A distinction is made between the order holding containers 20, which are supplied to the workstations 18 of the order picking area 4 already partly filled with some of the order, i.e. already partly filled with "A" articles from storage area 7 for further order picking and filling with "B" and "C" articles for the completion of an order, and empty order holding containers 20 which are preferably supplied from a container storage track 28 arranged in front of the order picking area 4 or workstations 18.

Figure 3:
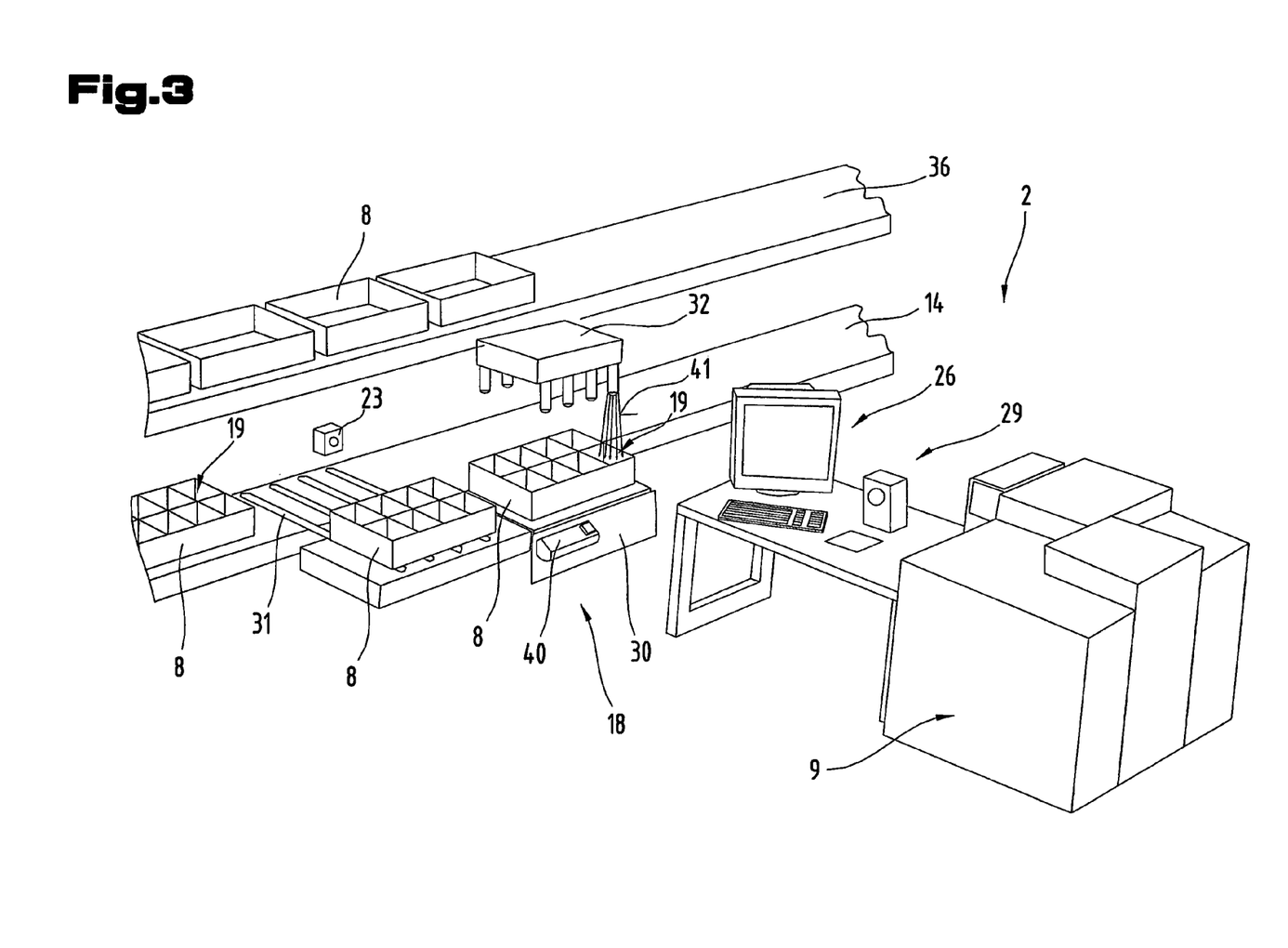
FIG. 3 a schematic view of a workstation in the incoming goods area of the goods distribution centre.

FIGS. 2 and 3 show by way of example the equipment and an example of the arrangement of the equipment of the incoming goods area 2 by way of an example of one of the workstations 18. The equipment consists for example of the data input and output device 26, an article scanner 29 for reading an article code of the incoming goods and a set of scales 30 and a quantity—display device, which displays to the operating staff the quantity defined in a holding compartment 19 for optimum filling.

The scales 30 are used to carry out a weight control to check the plausibility of the weight, which is performed by comparing the known individual weight of the product 9 and the identified quantity. Furthermore, a detection means 23 is provided for allocating or controlling the storage and transport container 8 by identifying the container data. The storage and transport container 8 is provided for filling by an ejector device 31. By means of a light pointer device 32 an operator guide is provided, by means of which the holding compartment 19 is illuminated in which the article 9 is to be inserted. The quantity to be placed into the storage and transport container 8 or holding compartment 19 is determined by the storage, control and monitoring device 25 and displayed at the workstation 18 of the operator, as already mentioned. After successfully inserting the requirement quantity this is confirmed by the operator and the weighing control check is performed on the scales 30. If the results coincide the filled or partly filled transport and storage container 8 is transferred to the continuous conveying device 14. If they do not coincide an error message is activated, after which an immediate check can be made and the error corrected immediately.

This equipment of the workstation 18 in the incoming goods area 2 ensures the correct allocation of goods 9 to one or more storage and transport containers 8 provided by the container data for storing the goods 9 or one or more holding compartments. The transfer of data or communication of data—according to double arrow 33—between the data input and output device 26 is performed via a line 34 to the central storage, control and monitoring device 25 or a computer and data memory device 35, however this can also be conducted wirelessly.

As also shown, the continuous conveying device 14 of the incoming goods area 2 can preferably be extended by a storage track 36 to be used if necessary in circulation, e.g. for covering peak periods in the incoming goods area 2. In this case it is also possible to subdivide this into individually monitorable and controllable transport sections by arranging several detection means 23 along the conveying device 10.

As also shown in FIG. 2 the separately arranged incoming returns area 3 is connected to the incoming goods area 2 and the continuous conveying device 14. In the incoming returns area 3, returning goods 9 or articles are taken in, checked that they coincide with the original delivery and are in perfect condition, if there are no objections to their return they are taken up and treated as other incoming goods, i.e. in this case a defined storage and transport container 8 is provided for the article, the inserted quantity is confirmed, and the returned goods are included in the usual circulation of goods.

As shown in particular in FIG. 3 a further storage track 36 for supplying preferably unpartitioned storage and transport containers 8 is allocated to the incoming goods area, which if necessary, i.e. on the arrival of larger amounts of a specific article are made available to the operating staff in the incoming goods area 2 and removed manually from the storage track 36 and after establishing the container data are allocated to the transport flow on the continuous conveying device 14.

Figure 4:
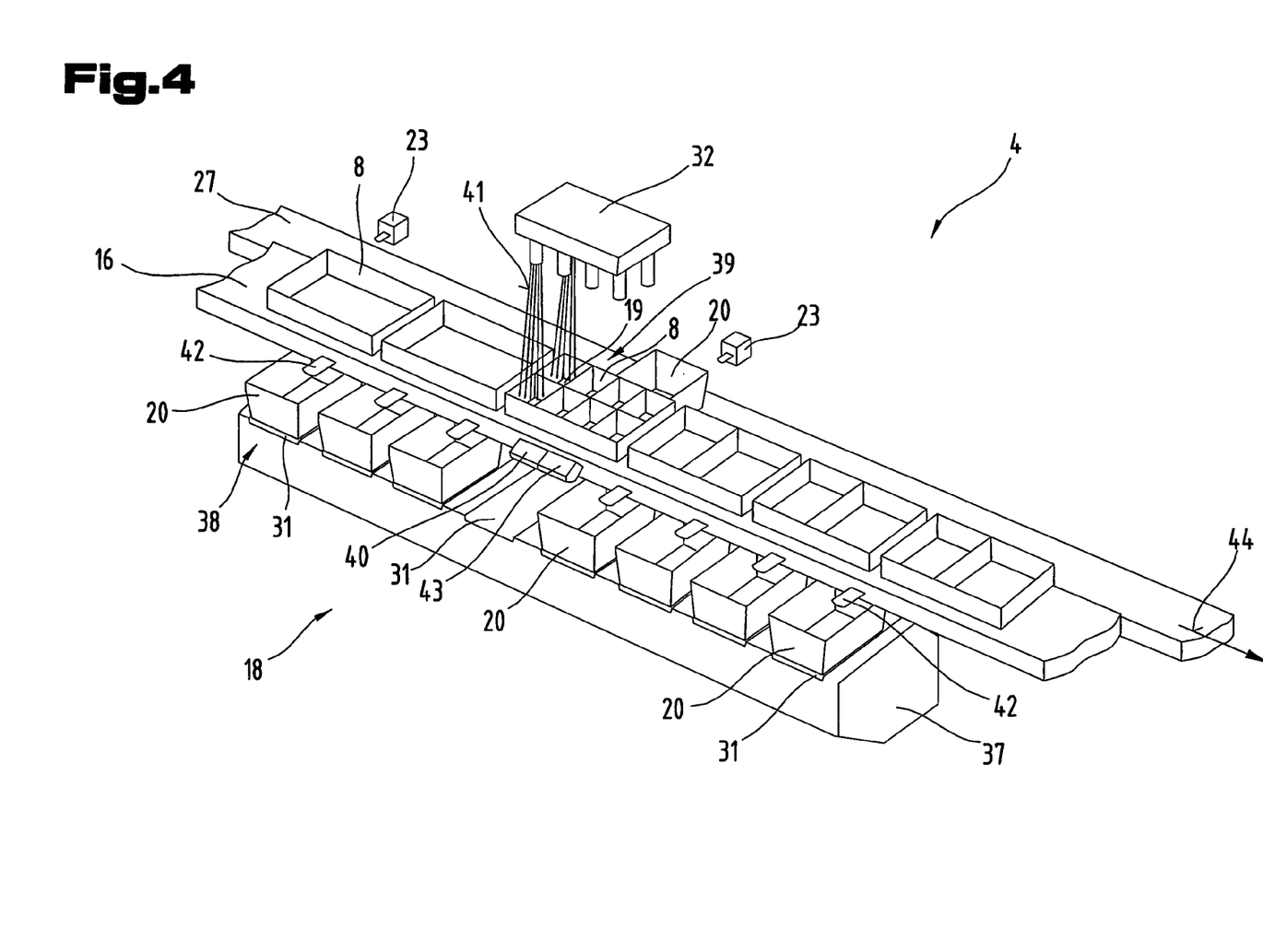
FIG. 4 a schematic view of a workstation in the order picking area of the goods distribution centre.

In FIGS. 2 and 4 for example the equipment and an example of the arrangement of the equipment of the order picking area 4 with one of the workstations 18 are shown. The latter comprises an operating desk 37 extending along the length of the order conveying device 27, on which desk several points 38 arranged in rows adjacent to one another are provided for order holding containers 20—preferably up to about eight—for holding the ordered goods 9. The latter are transferred via an ejector device 31 allocated to each point 38 according to the order allocation and identification of the container data by the detection means 23 automatically by the order conveying device 27 to the point 38 on the operating desk 37, whereby there is an exact allocation to an order or order-related and picked product 9. The order holding containers 20 can be containers already partly filled with "A" goods 9, which need to be filled with "B" and/or "C" goods 9 or can be empty containers 20, in case the order only includes such articles. The majority however are already partly filled order holding containers 20 transferred from the storage area 7 to the order picking area 4.

Almost synchronously with the allocation of the order holding container 20 for an order one or more storage or transport containers 8, containing the goods 9 for the order, is supplied on the continuous conveying device 16 running preferably slightly above the operating desk 37 and parallel to the latter by the storage, control and monitoring device 25 and positioned at an order picking point 39. A light pointer device 32, as already mentioned in the incoming order area 2, is arranged above this.

From the storage, control and monitoring device 25 a signal is sent to the workstation 18 or to the order picker located there by displaying the quantity on a display means 40 to be taken from the storage and transport container 8 or a specific holding compartment 19, whereby the storage and transport container 8 or the holding compartment 19 is illuminated or lit by means of the light pointer device 32. At the same time the order holding container 20 specified to hold the articles and positioned at one of the points 38 is shown optically by a light beam 41 from a light source 42 allocated to each point 38. The order picker now has the task of removing the displayed number of articles from the storage and transport container 8 or holding compartment 19 and inserting them into the order holding container 20 identified by the light source 42 and reporting the completion of the procedure to the storage, control and monitoring device 25 by activating a button 43 in communication with the latter. Once it has been checked in the computer and data memory device 35 and established that the order has been picked out correctly, the order holding container 20 is transferred automatically via the ejector device 31 to the order conveying device 27. If additional goods 9 need to be inserted into the order holding container 20 from other storage and transport containers 8 or holding compartments 19 the aforementioned procedure is repeated.

By means of the number of positions 38 provided on the operating desk 37, preferably as already mentioned up to about eight, there can be flexibility in the synchronous bringing together of the storage and transport containers 8 and allocated order holding containers 20. The ready picked order holding containers 20 are conveyed to the outgoing goods area 6—according to arrow 44—after being transferred to the order conveying device 27.

In the following in a simplified description of the sequence the stages of goods distribution are listed separately for both incoming goods and outgoing goods, by way of example for a possible variant of the method without claiming to be complete.

Example Incoming Goods:
  Identify the incoming product according to delivery paperwork—identification in the data input and output device 26 at workstation 18 of the incoming goods area 2, data to storage, control and monitoring device 25—match with order data;
  Identification of the article data by means of article scanner 29, allocation and provision of storage and transport containers 8 corresponding to the article data and the quantity to be stored, already article-related storage and transport containers 8,
    a) from circulation in the incoming goods area;
    b) from circulation in the order picking area,
    c) from the storage areas 5, 7;
  provision of empty storage and transport containers 8 and allocation of container/article data;
  display of the quantity of each article to be placed into the provided storage and transport containers 8;
  display of the related storage and transport container 8, or holding compartment 19 by guiding the operator e.g. by light pointer device 32;
  permanent priority access by the order picking area e.g.—interruption of the insertion procedure on arrival of a priority signal e.g. light signal—actual quantity determined—control weighing on scales 30, weight plausibility check—container release;
  filling the storage and transport containers 8 or holding compartments 19 by guiding operator by light pointer device 32 for the storage and transport container 8 to be filled or the holding compartment or the holding compartments 19 on the scales 30;
  confirmation of the stored quantity by inputting the amount into the data terminal of the scales 30 or the data input and output device 26;
  weight/plausibility check by computer 35 of the storage, control and monitoring device 25 or external computer of the data input and output device 26;
  procedure completed successfully, release to
    a) send full or partly filled storage ad transport containers 8 to storage areas 5 for "B" and "C" articles (average and low turnover) and chaotic storage by filling various storage sites according to access and quantity identification codes;
    b) send to storage area 7 for "A" articles (high turnover);
    c) transfer to continuous conveying device 16 of the order picking area 4.

Example Outgoing Goods:
  Order allocation to order picking area 4—storage, control and monitoring device 25;
  almost synchronous convergence to workstation 18 of the order picking area 4 of order holding container 20,
    a) from storage area 7—"A" articles, prepicked,
    b) from container storage track 28, empty, re-indexed, with storage and transport container 8 with order-related goods 9,
      a) from storage area 5, "B" and "C" articles,
      b) from circulation in incoming goods area 2—continuous conveying device 14,
      c) from storage track 36 in the incoming goods area,
      d) from circulation in order picking area 4—continuous conveying device 16;
  transfer of the order-holding container 20 from the order conveying device 27 to position 38 at the workstation 18 of the order picking area 4;
  parking the storage and transport container 8 at the order picking position 39;
  signalling/display of the quantity to be removed,
  light signalling of storage and transport container 8, or holding compartment 19 for removal of goods—e.g. light pointing device 32,
  display order holding container 20 to fill with goods—e.g. light source;
  confirm quantity—e.g. alarm button 43;
  delivery of the order holding container 20—order conveying device 27 to the outgoing goods area 6;
  conveying of the storage and transport container 8 to
    a) goods input area,
    b) additional workstation in the order picking area,
    c) in the storage area 5—"B" and "C" articles—chaotic storage,
    d) additional workstation 30 of the order picking area 4.

The embodiments show possible embodiment variants of the distribution centre 1, wherein it should be noted that the invention is not restricted to the embodiments shown in particular, but rather various combinations of the individual embodiment variants are possible and this variability can be achieved by a person skilled in this technical field on the basis of the teaching on technical procedure of the present invention. Also all conceivable embodiment variants, which are possible by combining individual details of the shown and described embodiment variants, are included by the scope of protection.

For form's same it should be pointed out that for a better understanding of the structure of the goods distribution centre 1 the latter and its components are not always represented to scale and/or have been enlarged and/or reduced in size.

The objective forming the basis of the independent solutions of the invention can be taken from the description.

Mainly the individual embodiments shown in FIGS. 1; 2; 3, 4 can form the subject matter of independent solutions according to the invention. The objectives and solutions of the invention can be taken from the detailed descriptions of said figures.

LIST OF REFERENCE NUMBERS

1. Goods distribution centre
2. Incoming goods area
3. Returns area
4. Order picking area
5. Storage area
6. Outgoing goods area
7. Storage area
8. Storage and transport container
9. Goods
10. Conveying device
11. Storage shelf
12. Storage and retrieval means
13. Shelf operating device
14. Continuous conveying device 15. Transfer conveying means
16. Continuous conveying device
17. Arrow
18. Workstation
19. Holding compartment
20. Order container
21. Feeder and ejection means
22. Subsidiary conveyor
23. Detection means
24. Data scanner
25. Storage, control and monitoring device
26. Data input and output device
27. Order conveying device
28. Container storage track
29. Article scanner
30. Scales
31. Ejector device
32. Light pointer device
33. Double arrow
34. Line
35. Computer and data memory
36. Storage track
37. Operating desk
38. Position
39. Order picking point
40. Display means
41. Light beam
42. Light source
43. Alarm button
44. Arrow

The invention claimed is:

1. A goods distribution center for storage and transport containers for goods to be handled, the goods distribution center comprising:
   at least two storage areas for groups of goods with different turnover rates, the at least two storage areas comprising a first storage area and a second storage area;
   an incoming goods area having:
      a first conveying device,
      the first storage area,
      a first storage and retrieval device for storage and retrieval of the storage and transport containers between the first conveying device and the first storage area, and
      at least one first workstation having a data input and output device;
   at least one order picking area having:
      a second conveying device,
      the second storage area,
      a second storage and retrieval device for storage and retrieval of the storage and transport containers between the second conveying device and the second storage area, and
      at least one second workstation for picking goods from storage and transport containers into order containers, the at least one second workstation having a data input and output device;
   an outgoing goods area;
   an order conveying device connecting the at least one order picking area with the outgoing goods area in a manner such that order containers can be transferred from the at least one order picking area to the outgoing goods area;
   a storage, control, and monitoring device connected communicatively with the data input and output devices at the least one first workstation and at the at least one second workstation;
   detection devices for identifying container data of the storage and transport containers, arranged on the first and second conveying devices, and connected communicatively with the storage, control, and monitoring device; and
   a transfer conveying device connecting the first conveying device of the incoming goods area and the second conveying device of the at least one order picking area in a manner such that goods can be transported from the first conveying device of the incoming goods area to the second conveying device of the at least one order picking area;
   wherein the first conveying device of the incoming goods area is designed as a first continuous loop device and the second conveying device of the at least one order picking area is designed as a second continuous loop device;
   wherein the first continuous loop device and the second continuous loop device are separately arranged from each other and are connected together by the transfer conveying device;
   wherein the first continuous loop device cooperates with the first storage and retrieval device in a manner such that goods can be transported between the first continuous loop device and the first storage and retrieval device; and
   wherein the second continuous loop device cooperates with the second storage and retrieval device in a manner such that goods can be transported between the second continuous loop device and the second storage and retrieval device.

2. The goods distribution center according to claim 1, wherein the first continuous loop device of the incoming goods area is connected to a storage track such that goods can be transported from the first continuous loop device of the incoming goods area to the storage track.

3. The goods distribution center according to claim 2, wherein the first continuous loop device of the incoming goods area and/or the storage track and/or the second continuous loop device of the at least one order picking area is/are divided into transport sections; and
   wherein the transport sections are monitored by a number of the detection devices provided along the first continuous loop device of the incoming goods area and/or along the storage track and/or along the second continuous loop device of the at least one order picking area.

4. The goods distribution center according to claim 1, further comprising the storage and transport containers for the goods to be handled;
   wherein at least one storage and transport container of the storage and transport containers is divided into holding compartments.

5. The goods distribution center according to claim 4, wherein the at least one storage and transport container includes two or four or six or eight holding compartments.

6. The goods distribution center according to claim 1, further comprising the storage and transport containers for the goods to be handled;
   wherein at least one identification field comprising at least one data set is provided on at least one storage and transport container of the storage and transport containers.

7. The goods distribution center according to claim 1, further comprising:
   subsidiary conveyors; and
   feeder and ejector devices connecting the subsidiary conveyors to the first and second continuous loop devices;

wherein the subsidiary conveyors are arranged at the at least one first workstation and at the least one second workstation.

8. The goods distribution center according to claim 7, wherein at least one detection device of the detection devices is arranged on the feeder and ejector devices.

9. The goods distribution center according to claim 7, wherein to at least one first workstation and the at least one second workstation are arranged on the subsidiary conveyors or comprise desks; and
wherein predefined points are provided at the at least one first workstation and at the at least one second workstation for manipulating goods in or out of the storage and transport containers.

10. The goods distribution center according to claim 9, wherein the detection devices are arranged at the predefined points.

11. The goods distribution center according to claim 9, further comprising the storage and transport containers for the goods to be handled;
wherein at least one storage and transport container of the storage and transport containers is divided into holding compartments;
wherein the at least one order picking area comprises at least one order picking site;
wherein, at the predefined points and/or at the at least one order picking site, light sources and/or light pointer devices are arranged; and
wherein a number of the light sources and/or of the light pointer devices corresponds to a number of the holding compartments in the at least one storage and transport container.

12. The goods distribution center according to claim 1, wherein at least one detection device of the detection devices is arranged on at least one of the first and second storage and retrieval devices.

13. The goods distribution center according to claim 1, further comprising at least one set of scales for control weighing the storage and transport containers;
wherein the at least one set of scales is arranged at at least one of the at least one first workstation and the at least one second workstation.

14. The goods distribution center according to claim 1, further comprising at least one container storage track for supplying empty storage and transport containers;
wherein the at least one container storage track is connected with the second continuous loop device of the at least one order picking area in a manner such that containers can be transported from the at least one container storage track to the second continuous loop device of the at least one order picking area.

15. A method for operating a goods distribution center for storage and transport containers, the goods distribution center comprising:
an incoming goods area having:
a first conveying device,
a first storage area for high-turnover goods,
a first storage and retrieval device for storage and retrieval of the storage and transport containers between the first conveying device and the first storage area, and
at least one first workstation having a data input and output device;
at least one order picking area having:
a second conveying device,
a second storage area for average and low-turnover goods,
a second storage and retrieval device for storage and retrieval of the storage and transport containers between the second conveying device and the second storage area, and
at least one second workstation for picking goods from storage and transport containers into order containers, the at least one second workstation having a data input and output device;
an outgoing goods area;
an order conveying device connecting the at least one order picking area with the outgoing goods area in a manner such that order containers can be transferred from the at least one order picking area to the outgoing goods area;
a storage, control, and monitoring device with a computer and data memory unit;
external data input and output devices connected communicatively with the data input and output devices at the at least one first workstation and at the at least one second workstation; and
detection devices for detecting article and container data;
a transfer conveying device connecting the first conveying device of the incoming goods area and the second conveying device of the at least one order picking area in a manner such that goods can be transported from the first conveying device of the incoming goods area to the second conveying device of the at least one order picking area;
wherein the method comprises steps of:
entering in the computer and data memory unit a goods order according to article types, the goods order ordering at least one product;
identifying at least one order container for the goods order; and
transporting the at least one identified order container and at least one storage and transport container essentially simultaneously to the at least one second workstation in the at least one order picking area, the at least one storage and transport container containing the at least one product ordered by the goods order;
wherein the at least one storage and transport container containing the at least one product ordered by the goods order:
either is a storage and transport container stored within the first storage area for high-turnover goods or within the second storage area for average and low-turnover goods if the demand can be met, or
is a storage and transport container provided from the incoming goods area if an additional demand can be met by the stock of goods in the incoming goods area.

16. The method according to claim 15, wherein the at least one identified order container is supplied to a predefined point of the at least one second workstation of the at least one order picking area;
wherein the storage and transport container containing the at least one product ordered by the goods order is supplied to an order picking point of the at least one second workstation of the at least one order picking area; and
wherein the method further comprises steps of:
illuminating or lighting at the order picking point holding compartments of the storage and transport container containing the at least one product ordered by the goods order; and
identifying at the predefined point at least one identified order container.

17. The method according to claim 15, wherein the goods order includes a quantity of the at least one product; and wherein the method further comprises a step of displaying on a display device at the at least one second workstation of the at least one order picking area the quantity.

18. The method according to claim 15, further comprising steps of:
checking and identifying incoming goods via article codes on the incoming goods;
determining via the computer and data memory unit a filling amount;
after the checking and identifying of goods, allocating and making available the storage and transport containers according to the filling amount;
distributing product articles to the at least one first workstation of the incoming goods area;
inserting at the at least one first workstation of the incoming goods area the product articles into the storage and transport containers;
during the insertion, carrying out priority monitoring by checking for a request for a transport and storage container by the computer and data memory unit for the at least one order picking area for removing goods to pick out an order, the request including a quantity of the goods;
if the request is identified, interrupting the insertion of goods and:
checking a quantity of goods in a storage and transport container of the storage and transport containers at the at least one first workstation of the incoming goods area;
checking weight plausibility of the goods in the storage and transport container by weighing the storage and transport container on a set of scales at the at least one first workstation of the incoming goods area; and
sending the storage and transport container via the transfer conveying device from the first conveying device of the incoming goods area to the second conveying device of the at least one order picking area and to an order picking point of the at least one order picking area.

19. The method according to claim 18, further comprising a step of chaotically storing filled or partly filled storage and transport containers in the first and second storage areas to achieve an even utilization of the first and second conveying devices and/or of the first and second storage and retrieval devices;
wherein the chaotic storing occurs according to a frequency of access of the filled or partly filled storage and transport containers.

20. The method according to claim 18, further comprising steps of:
displaying at the at least one first workstation of the incoming goods area on a display device a quantity of goods to be inserted into the storage and transport container at the at least one first workstation of the incoming goods area or into a holding compartment of the storage and transport container at the at least one first workstation of the incoming goods area;
inserting the quantity of goods into the storage and transport container at the at least one first workstation of the incoming goods area or into the holding compartment of the storage and transport container at the at least one first workstation of the incoming goods area; and after the inserting, confirming in the data input and output device at the at least one first workstation of the incoming goods area or in the set of scales that the quantity of goods has been inserted into the storage and transport container at the at least one first workstation of the incoming goods area or into the holding compartment of the storage and transport container at the at least one first workstation of the incoming goods area.

21. The method according to claim 20, wherein the filling amount is determined by the computer and data memory unit according to a volume of goods and a holding volume of the storage and transport containers.

22. The method according to claim 20, wherein the filling amount is determined according to a turnover of a type of goods to achieve a diffusion of access.

23. The method according to claim 20, further comprising steps of:
after the confirmation, performing on the storage and transport container at the at least one first workstation of the incoming goods area a weighing check on the set of scales and a weight plausibility check in the computer and data memory unit; and
transferring the storage and transport container at the at least one first workstation of the incoming goods area to the first conveying device of the incoming goods area.

24. The method according to claim 15, further comprising a step of managing for the storage and transport containers as a buffer storage a portion of a holding capacity of the first conveying device of the incoming goods area and/or a portion of a holding capacity of the second conveying device of the at least one order picking area.

25. The method according to claim 24, further comprising a step of occupying the portions of the holding capacities of the first and second conveying devices by the storage and transport containers or by variants of goods according to turnover frequency and/or turnover quantities.

26. The method according to claim 15, further comprising a step of storing storage and transport containers holding the same types of goods in the first and second storage areas according to a group of goods.

27. The method according to claim 15, wherein variants of goods can be freely allocated to the storage and transport containers or to holding compartments of the storage and transport containers.

28. The method according to claim 15, wherein the container data includes information about a number of holding compartments of the storage and transport; and
wherein the method further comprises a step of determining via the container data a holding capacity of the storage and transport containers.

29. The method according to claim 15, wherein the container data includes information about alignment of the storage and transport containers at predefined positions at the at least one order picking area and/or at order picking points of the at least one order picking area.

30. The method according to claim 18, further comprising a step of after the identification of the incoming goods, identifying via a light beam a holding compartment of a storage and transport container at the at least one first workstation of the incoming goods area.

* * * * *